Patented Sept. 15, 1953

2,651,835

UNITED STATES PATENT OFFICE 2,651,835

CLAD MAGNESIUM BASE ALLOYS

John H. Jackson, Columbus, Ohio, assignor, by mesne assignments, to Mathieson Chemical Corporation, New York, N. Y., a corporation of Virginia No Drawing. Application July 21, 1948,
Serial No. 40,005

1 Claim. (Cl. 29—197.5)

This invention relates to clad magnesium-base alloys, and has for its object the provision of a clad article comprising a magnesium-lithium base alloy. The clad magnesium-lithium base articles of the invention combine the lightness, strength, and other properties of the magnesium-lithium base alloys with the corrosion-resistant properties of another metal. This may be accomplished by using the corrosion resistant metal as a skin or cladding over the magnesium-lithium base alloy so that the resulting article combines the desirable features of both metals.

It is, therefore, an object of this invention to provide a composite article comprising a magnesium-lithium base alloy with a cladding of a corrosion-resistant magnesium alloy, or other metal or alloy. Still another object of this invention is to produce an article with considerably improved notch sensitivity over the base metal which is a magnesium-lithium base alloy. Other objects and advantages of the present invention will be apparent in view of the following description thereof.

Examples of magnesium-lithium base alloys suitable as base metal to be clad are described in the application of Alfred C. Loonam, Serial Number 602,171, issued as Patent No. 2,453,444, and the applications of Alfred H. Hesse, Serial Numbers 616,160, now Patent No. 2,507,714, 616,161 and 781,253. Examples of metals which have been found suitable for cladding over the magnesium-lithium alloys are 2-S aluminum, stainless steel and a binary alloy of magnesium and lithium, wherein the ratio of magnesium to lithium is about 8:1. It will readily be understood that other corrosion resistant materials could be used as cladding.

In achieving a satisfactory article according to the method of this invention, it is necessary first of all that the plates or sheets which are to make up the composite structure be thoroughly cleansed of all surface contaminants and impurities. This may be accomplished in any convenient manner as by abrading with steel wool or washing with alcohol or xylene or some suitable solvent. The cleansed surfaces of the plates or sheets are placed in adjacent position and the plates are attached together by spot welding, or otherwise fastening the plates together. The bonded assembly is then heated preferably to a rather critical temperature of about 650° F. to 750° F. as disclosed in the copending application of Paul D. Frost, Serial Number 46,547, filed August 27, 1948, and subjected to a reduction in an ordinary rolling mill by at least two passes through the rolls, preferably with reheating between passes. It is advantageous, but not necessary, that the heating of the bonded article be carried on in a neutral or inert atmosphere.

The following examples will serve to more clearly illustrate the articles and a presently preferred method of producing the articles.

Example 1

Two pieces of the 8.1 Mg/Li binary alloy approximately 4" x 5" x 0.015" were clad on both sides of a 4" x 5" x 0.180" piece of the 6 Mg/Li—15% Cd—5% Ag high-strength alloy. The plates were cleaned by rubbing with steel wool until the visible oxide was removed. They were then tacked together by a number of spot welds around the periphery in order to prevent lateral separation of the plates during the first rolling pass. The assembled plates (0.210" total thickness) were next heated for several minutes at 700° F. and hot rolled one 50% reduction pass at this temperature. The pieces adhered. They were reheated at 700° F. for several minutes and given a second 50% reduction pass at this temperature. After this treatment the assembly (now 0.043" total thickness) was so well bonded that the pieces could not be separated even under the severest deformation.

Example 2

Two pieces of 2-S aluminum (commercially pure aluminum) approximately 4" x 5" x 0.025" were clad on both sides of a 4" x 5" x 0.255" piece of the 6 Mg/Li—15% Cd—5% Ag high-strength alloy. The plates were cleaned by rubbing with steel wool until the visible oxide was removed. They were then tacked together by several spot welds at each end in order to prevent lateral separation of the plates during the first rolling pass. The assembled plates (0.305" total thickness) were next heated for several minutes at 750° F. and hot rolled one 60% reduction pass at this temperature. The pieces adhered. They were then reheated for several minutes at 750° F. and given a second 60% reduction pass at this temperature. They were then reheated for several minutes at 750° F. and given a 30% reduction pass at this temperature. After this treatment the assembly (now 0.043" total thickness) was so well bonded that the pieces could not be separated even under the severest deformation.

Example 3

One piece of stainless steel approximately

1″ x 3″ x 0.030″ was clad on one side of a 1″ x 3″ x 0.100″ piece of the 6 Mg/Li—15% Cd—5% Ag alloy. The plates were cleaned by rubbing with steel wool. They were then tacked together by several spot welds at the ends in order to prevent lateral separation of the plates during the first rolling pass. The assembled plates (0.130″ total thickness) were then heated for several minutes at 700° F. and hot rolled one 73% reduction pass at this temperature. Two subsequent passes reduced the thickness by 11%, and 3% respectively. The assembly was heated for several minutes at 700° F. between each pass. The steel piece was not appreciably reduced by the rolling, the magnesium-lithium alloy withstanding all of the reduction. The final thickness was 0.030″.

Example 4

Two pieces of the 8.1 Mg/Li binary alloy, approximately 4″ x 5″ x 0.023″ were clad on both sides of a 4″ x 5″ x 0.255″ piece of the 6 Mg/Li—15% Cd—5% Ag high-strength alloy. The plates were cleaned as described in the preceding examples. They were then tacked together by several spot welds at each end to prevent lateral separation of the plates during the first rolling pass. The assembled plates (0.301″ total thickness) were then heated for several minutes at 650° F. and hot rolled one 50% reduction pass. Subsequent passes reduced the thickness by 42%, 48%, and 11% respectively. The assembly was heated for several minutes at 650° F. between each pass. The final well-bonded assembly had a thickness of 0.040″.

The 8.1 Mg/Li binary is not notch sensitive while the high-strength base material is very much notch sensitive. It has been found that the notch sensitivity of the clad article is considerably superior to that of the unclad base material.

I claim:

An article comprising a high-strength magnesium-lithium base alloy containing 15% Cd and 5% Ag with the remaining 80% consisting essentially of magnesium and lithium the ratio of magnesium to lithium being 6:1, and a corrosion resistant cladding consisting of a binary alloy of about 8 parts of magnesium to 1 part of lithium which cladding is in direct contact with the base alloy and is strongly bonded thereto.

JOHN H. JACKSON.

References Cited in the file of this patent

UNITED STATES PATENTS

| Number | Name | Date |
|---|---|---|
| 2,011,613 | Brown | Aug. 20, 1935 |
| 2,054,054 | Jarman | Sept. 8, 1936 |
| 2,301,332 | Scheeler | Nov. 10, 1942 |
| 2,221,251 | McDonald | Nov. 12, 1940 |
| 2,221,255 | McDonald | Nov. 12, 1940 |
| 2,366,168 | Bakarian | Jan. 2, 1945 |
| 2,366,185 | Diehl | Jan. 2, 1945 |
| 2,453,444 | Loonam | Nov. 9, 1948 |
| 2,507,714 | Hesse | May 10, 1950 |

OTHER REFERENCES

Article, "The Lithium-Mag. Equilibrium Diagram," pp. 319–332, by Henry et al., Institute of Metals, Div. AIME, vol. 111, 1934. (Copy in Div. 3.)